United States Patent
Serizawa

(10) Patent No.: US 6,443,630 B1
(45) Date of Patent: Sep. 3, 2002

(54) OPTICAL CONNECTOR, SLEEVE, AND MANUFACTURING METHOD FOR SLEEVE

(75) Inventor: Naoshi Serizawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/457,009

(22) Filed: Dec. 8, 1999

(30) Foreign Application Priority Data

Dec. 28, 1998 (JP) .......................... 10-372487

(51) Int. Cl.⁷ ................................. G02B 6/36
(52) U.S. Cl. .......................... 385/88; 385/89
(58) Field of Search ............... 385/76, 77, 78, 385/84, 88–93

(56) References Cited

U.S. PATENT DOCUMENTS

| | | | |
|---|---|---|---|
| 4,199,222 A | * 4/1980 | Ikushima et al. | 350/96.19 |
| 5,071,219 A | 12/1991 | Yurtin et al. | 385/78 |
| 5,475,783 A | * 12/1995 | Kurashima | 385/92 |
| 5,489,298 A | * 2/1996 | Love et al. | 623/2 |
| 5,629,997 A | 5/1997 | Hardy, Jr. | 385/33 |
| 5,784,513 A | 7/1998 | Kuribayashi et al. | 385/88 |
| 6,062,742 A | * 5/2000 | Yuuki | 385/88 |

FOREIGN PATENT DOCUMENTS

JP 6-33443 8/1994 ............ G02B/6/36

OTHER PUBLICATIONS

Yaman Hakmi, Optical Fibers: A Modern Perspective [on-line]. 1998 [retrieved on Jul. 23, 2001] Retrieved from the Internet: <URL: http://yaman.hypermart.net/optical–fiber.htm>.*
Siegmund, Walter P., Kingslake, Fiber Optics, vol. IV, pp. 4–5.

* cited by examiner

Primary Examiner—Cassandra Spyrou
Assistant Examiner—Alessandro V. Amari
(74) Attorney, Agent, or Firm—Sughrue Mion, PLLC

(57) ABSTRACT

An optical connector 21 has sleeves 25 and 25 placed between an optical fiber 40 and reception and transmission modules 26 and 27, wherein the N.A. of each sleeve 25 is larger than the N.A. of the optical fiber 40. A holder 36 forming a part of the sleeve 25 is made of a synthetic resin and can be colored. Further, the sleeve 25 is formed by cutting an optical fiber source line 52, etc.

26 Claims, 9 Drawing Sheets

PRIOR ART

PRIOR ART

PRIOR ART

OPTICAL CONNECTOR, SLEEVE, AND MANUFACTURING METHOD FOR SLEEVE

BACKGROUND OF INVENTION

1. Field of Invention

This invention relates to an optical connector used with a multiplex transmission circuit of a vehicle, such as an automobile, a sleeve placed in a receptacle forming a part of the optical connector, and a manufacturing method for the sleeve.

2. Related Art

As this type of optical connector and sleeve, an optical connector previously proposed by the applicant (art disclosed in JP-B-6-33443UM) is generally known.

The optical connector and sleeve disclosed in the gazette will be discussed with reference to FIGS. 9 to 11.

First, in FIG. 9, reference numeral 1 denotes an optical connector and the optical connector 1 comprises a receptacle 2 as a machine side connector and an optical plug 3 as an optical fiber side connector.

As shown in FIGS. 9 and 10, the receptacle 2 has a housing 4 made of a synthetic resin and storage chambers 5 and 5 in the housing 4 stores reception and transmission modules 6 and 6' in a state in which they are supported on back sheets 7 and 7 each made of an elastic member such as rubber. On the rear face, a cap 8 is placed, and reception tubes 10 and 10 extended forward matching the axes of lenses 9 and 9 are placed ahead of the storage chambers 5 and 5 in which the reception and transmission modules 6 and 6' are supported. Sleeves 13 and 13 each comprising a light transmission member 11 consisting of a core and a clad (not shown) (for example, a multimode plastic optical fiber of about Ø1) bonded and fixed to a holder 12 like a metal cylinder and ground on both end faces are inserted into the reception tubes 10 and 10.

The optical fiber 3 is fitted and connected to the receptacle 2 and as shown in FIGS. 9 and 11, comprises ferrule assemblies 15 and 15 for covering optical fibers 14 and 14 (only one is shown throughout the drawings) in a state in which the ends of the optical fibers 14 and 14 are exposed at the tips, a plug housing 17 provided with a tubular partition wall 16 for housing and protecting the ferrule assemblies 15 and 15, a spring cap 18 fitted and fixed to the plug housing 17, and a boot 19 fitted to the rear part of the spring cap 18.

The plug housing 17 is formed with shoulder part 17a engaging collar-like retention parts 15a and 15a placed in the latter half parts of the outer peripheries of the ferrule assemblies 15 and 15 and springs 20 and 20 are placed between the retention parts 15a and 15a and inner tube parts 18a and 18a of the spring cap 18 so that the ferrule assemblies 15 and 15 are urged forward all the time.

The retention parts 15a and 15a engage the shoulder part 17a, whereby tip parts A of the ferrule assemblies 15 and 15 (see FIG. 11; corresponding to positions of incidence and emission end faces (light reception face and light emission face) of the optical fibers 14) are always retracted inside from front end face B of the plug housing 17 (see FIG. 11).

In the described configuration, connection of the receptacle 2 and the optical plug 3 will be discussed with reference to FIG. 9.

When the optical plug 3 is fitted to the receptacle 2, the reception tubes 10 and 10 enter the plug housing 17 and at the same time, the ferrule assemblies 15 and 15 enter the reception tubes 10 and 10.

The ferrule assemblies 15 and 15 abut the tips of the reception tubes 10 and 10 and adequate contact pressure is kept by the elastic force of the springs 20 and 20.

In this state, the tip parts A (see FIG. 11) and the sleeves 13 and 13 and the lenses 9 and 9 and the sleeves 13 and 13 are placed with gaps (not shown) kept to the minimum, whereby the gap loss of the optical connector 1 is minimized, so that a transmission margin when light communication is executed can be widened.

Problem to be Solved by the Invention

By the way, in the described related art, a gap of 6 mm, for example, on the structure exists between the reception and transmission module 6, 6' and the optical fiber 14, 14, and the sleeve 13, 13 6 mm long, for example, is placed so as to bridge the gap. Preferably, the gap between the reception, transmission module 6, 6' and the sleeve 13, 13 and the gap between the optical fiber 14, 14 and the sleeve 13, 13 is made zero from the relation of the described gap loss.

However, it is very difficult to make the gaps zero because of the combination of the members; in even the described optical connector 1, a slight gap occurs in some cases and a light power loss occurs.

Taking the gap between the transmission module 6' and the sleeve 13 (not shown) as an example in the description, the transmission module 6' usually uses a light emitting diode and therefore if a gap occurs, a part of light emitted and diverged (emitted like radiation) from the light emitting diode leaks through the gap. A part of the leakage light is not again incident on the light transmission member 11 of the sleeve 13, of course; thus the light leakage part leads to a light power loss.

Since a plastic optical fiber (POF) having the same N.A. (numerical aperture)=0.5 as the optical fiber 14 has been used as the light transmission member 11, there is a limit on reception of light from the transmission module 6' (light emitting diode). Of course, larger light than the N.A. of the light transmission member 11 exists, thus a light power loss cannot be avoided if the above-mentioned gap is contained.

Letting the refractive index of the core be n1 and that of the clad be n2 (n1>n2), the above-mentioned N.A. is defined by a relational expression of $N.A.=[(n1)2-(n2)2]½$.

On the other hand, the above-described light power loss is caused by not only the gap, but also by the assembly state (position) of the sleeve 13, 13.

That is, the receptacle 2 is made of a synthetic resin and a minute protrusion (not shown) for retaining the sleeve 13 is formed in the reception tube 10 molded integrally with the receptacle 2 and the sleeve 13 having the metal holder 12 is inserted into the reception tube 10. When the sleeve 13 is inserted, the minute protrusion is scraped, for example, by the holder 12 and a longitudinal or lateral shift occurs in the optical axis. Resultantly, a light power loss occurs.

Giving a more detailed description, the sleeve 13 is ground on both end faces, thus the possibility that the end face of the holder 12 may be an edge is high and when the sleeve 13 is inserted into the reception tube 10, it is hard to say that the minute protrusion functions normally.

For example, if four minute protrusions are formed at equal intervals in the reception tube 10 and the sleeve 13 is inserted in an insertion axis shift state, at least one of the minute protrusions is scraped by the end face of the holder 12 or is excessively compressed and crashed or broken.

Thus, it is easily understood that the inserted sleeve 13 loses stability, causing a shift to occur in the optical axis.

Therefore, also in this case, like the above-described gap problem, it is said that a light power loss cannot be avoided.

On the other hand, FIG. 12 graphs the optical axis shift (on horizontal axis, mm units) in a state in which the above-mentioned gap (gap amount, mm units) is contained and the light power loss (on vertical axis, dB units) to relate them to each other.

As also seen in the figure, it is said that the gap and the optical axis shift largely cause the light power to be lost. It is preferred that the gap amount and the optical axis shift are extremely small and how to manage them becomes a point for decreasing the light power loss. If the light power loss can be decreased, it is made possible to widen a margin optically downstream from the optical connector 1.

By the way, the sleeve 13 is manufactured through a large number of steps, thus it is preferred that cost reduction is accomplished while the above-mentioned problems are solved. It is also preferred to deal with the yield produced in the manufacturing process of the optical fibers 14, namely, waste pieces (not shown) left after several optical fibers 14 are cut away from the optical fiber source line wound around a bobbin together with the above-mentioned problems.

If the gap is managed more strictly than formerly, it is feared that the productivity of the members and the optical connector 1 will lower because of the dimension accuracy of the members; it does not become a preferred measure.

It is therefore an object of the invention to provide an optical connector, a sleeve, and a manufacturing method for the sleeve for making it possible to decrease a light power loss, to widen a transmission margin when light communication is executed, and also to reduce costs.

To the end, according to a first aspect of the present invention, there is provided an optical connector comprising sleeves capable of providing optical connection of an optical fiber and reception and transmission modules, the sleeves being placed between the optical fiber and the reception and transmission modules, provided in that N.A. of each of the sleeves is made larger than N.A. of the optical fiber.

In the optical connector of a second aspect of the present invention, in the optical connector as the first aspect of the present invention, the N.A. of at least the sleeve corresponding to the transmission module is made larger than the N.A. of the optical fiber.

In the optical connector of a third aspect of the present invention, in the optical connector of the first or the second aspect of the present invention, the N.A. of each of the sleeves is 0.5<N.A.<1.

In the optical connector of a fourth aspect of the present invention, in the optical connector of the first or the second aspect of the present invention, the N.A. of each of the sleeves is 0.6 or 0.7.

In the optical connector of a fifth aspect of the present invention, in the optical connector of the first to the fourth aspect of the present invention, the sleeve is made up of a light transmission member consisting of a core and a clad having a smaller refractive index than the core has and a cylindrical and coat-like holder placed in an outer peripheral margin of the light transmission member, the holder being formed of a synthetic resin material.

In the optical connector of a sixth aspect of the present invention, in the optical connector as the fifth aspect of the present invention, the holder is formed of a synthetic resin material which is a material equal to or softer than a member in which the sleeve is placed.

In the optical connector of a seventh aspect of the present invention, in the optical connector as the fifth or the sixth aspect of the present invention, the holder is formed of polyethylene.

In the optical connector of an eighth aspect of the present invention, in the optical connector as the fifth to seventh aspect of the present invention, the holder can be colored and is colored in a different color from that of the member in which the sleeve is placed.

In the optical connector of a ninth aspect of the present invention, in the optical connector as the eighth aspect of the present invention, the color of the holder is a different family color from the color of the member in which the sleeve is placed.

In the optical connector a tenth aspect of the present invention, in the optical connector as the eighth or ninth aspect of the present invention, the holder is colored in two distinguishable colors.

In the optical connector of an eleventh aspect of the present invention, in the optical connector as the tenth aspect of the present invention, one of the two distinguishable colors is orange if the color of the member in which the sleeve is placed is black.

In the optical connector of a twelfth aspect of the present invention, in the optical connector in any of the fifth to eleventh aspect, a collimator lens is formed at least at one end of the light transmission member.

In the optical connector of a thirteenth aspect of the present invention, in the optical connector in any of the first to twelfth aspect, the sleeve is formed by cutting an optical fiber source line or a waste tip of the optical fiber source line.

To the end, according to a fourteenth aspect of the present invention, there is provided a sleeve being placed between an optical fiber and a reception module or a transmission module placed in an optical connector and capable of providing optical connection of the optical fiber and the reception or transmission module, the sleeve comprising a light transmission member consisting of a core and a clad having a smaller refractive index than the core has and a cylindrical and coat-like holder placed in an outer peripheral margin of the light transmission member, provided in that the sleeve is formed in a larger N.A. than that of the optical fiber and is placed corresponding to at least the transmission module.

In the sleeve as a fifteenth aspect of the present invention, in the sleeve as claimed in claim 14, the larger N.A. than that of the optical fiber is 0.5<N.A.<1.

In the sleeve as a sixteenth aspect of the present invention, in the sleeve as the fourteenth aspect of the present invention, the larger N.A. than that of the optical fiber is 0.6 or 0.7.

In the sleeve as a seventeenth aspect of the present invention, in the sleeve as the fourteenth to the sixteenth aspect of the present invention, the holder is formed of a synthetic resin material which is a material equal to or softer than a receptacle forming a part of the optical connector.

In the sleeve of a eighteenth aspect of the present invention, in the sleeve as the seventeenth aspect of the present invention, the holder is formed of polyethylene.

In the sleeve of a nineteenth aspect of the present invention, in the sleeve as the seventeenth or the eighteenth aspect, the holder can be colored and is colored in a different color from that of the receptacle.

In the sleeve of a twentieth aspect of the present invention, in the sleeve as the nineteenth aspect of the present invention, the color of the holder is a different family color from the color of the receptacle.

In the sleeve of a twenty-first aspect of the present invention, in the sleeve as the nineteenth to the twentieth aspect of the present invention, the holder is colored in two distinguishable colors.

In the sleeve of a twenty-second aspect of the present invention, in the sleeve in any of the fourteenth to twenty-first aspect, a collimator lens is formed at least at one end of the light transmission member.

As the sleeve of a twenty-third aspect of the present, sleeve in any of the fourteenth to the twenty-second aspect of the present invention, is formed by cutting an optical fiber source line or a waste tip of the optical fiber source line.

To the end, according to a twenty-fourth aspect of the present invention, there is provided a sleeve being placed between an optical fiber and a reception module or a transmission module placed in an optical connector and capable of providing optical connection of the optical fiber and the reception or transmission module, the sleeve comprising a light transmission member consisting of a core and a clad having a smaller refractive index than the core has and a cylindrical and coat-like holder placed in an outer peripheral margin of the light transmission member, provided in that the holder is formed of a synthetic resin material which is a material equal to or softer than a receptacle forming a part of the optical connector.

In the sleeve of a twenty-fifth aspect of the present invention, in the sleeve in the twenty-fourth aspect of the present invention, the holder can be colored and is colored in a different color from that of the receptacle.

In the sleeve of a twenty-sixth aspect of the present invention, in the sleeve in the twenty-fifth aspect of the present invention, the holder is colored in two distinguishable colors.

To the end, according to a twenty-seventh aspect of the present invention, there is provided a manufacturing method of a sleeve comprising a light transmission member consisting of a core and a clad having a smaller refractive index than the core has and a cylindrical and coat-like holder placed in an outer peripheral margin of the light transmission member, the manufacturing method comprising the steps of cutting an optical fiber source line or a waste tip of the optical fiber source line and then grinding both end faces.

In the manufacturing method of a twenty-eighth aspect of the present invention, in the manufacturing method in the twenty-seventh aspect of the present invention, the holder is colored before or after both end faces are ground.

According to the first aspect of the present invention, the N.A. of the sleeve is made larger, whereby the light reception amount of the sleeve, namely, the light reception limit becomes large and the coupling efficiency is improved. The transmission distance of the sleeve is markedly short as compared with that of the optical fiber, thus if the N.A. becomes large, the transmission speed is not affected and the transmission speed similar to that in the related art can be maintained. Further, the limit of light reception becomes markedly large as compared with that in the related art. Thus, if an optical axis shift occurs, the light power loss can be suppressed as much as possible.

Therefore, the optical connector intended for decreasing the light power loss and widening a transmission margin when light communication is executed can be provided.

According to the second aspect of the present invention, the N.A. of at least the sleeve corresponding to the trans-mission module is made large, whereby the reception limit of light emitted from the transmission module becomes markedly large than that in the related art.

Therefore, the optical connector intended for decreasing the light power loss and widening a transmission margin can be provided like that described above.

According to the third aspect of the present invention as claimed in claim 3, the N.A. of the sleeve can be selected matching the N.A. of the optical fiber used with the optical connector.

According to the fourth aspect of the present invention, the N.A. becomes more preferred N.A. considering the productivity and general versatility in the above-mentioned range. Advantages in the optical connector similar to those described above can be provided, of course.

According to fifth aspect of the present invention, it is made possible to protect the light transmission member by the holder as in the related art. The holder is a synthetic resin material and thus the holder itself becomes softer than the metal in the related art. When the holder is placed in the optical connector, the trouble as in the related art wherein the holding member of the sleeve is scraped on the end face of the holder is avoided. Thus, it is made possible to suppress an optical axis shift.

Therefore, the optical connector intended for decreasing the light power loss and widening a transmission margin can be provided like that described above.

According to the sixth aspect of the present invention, the holder is formed of a synthetic resin material which is a material equal to or softer than the member in which the sleeve is placed. Thus, it is made possible to suppress an optical axis shift.

Therefore, the optical connector intended for decreasing the light power loss and widening a transmission margin can be provided.

According to the seventh aspect of the present invention, a synthetic resin material having general versatility is used and it is made possible to contribute to cost reduction, of course.

Therefore, the optical connector that can also lead to cost reduction can be provided.

According to the eighth aspect of the present invention, the holder is colored, whereby whether or not the sleeve is reliably placed at a predetermined position can be checked easily, and widening a gap can be suppressed.

Therefore, the optical connector intended for decreasing the light power loss and widening a transmission margin can be provided.

According to the ninth aspect of the present invention, visibility is enhanced and it is made possible to determine the sleeve placement position reliably.

According to the tenth aspect of the present invention, the holder is colored in two distinguishable colors, so that visibility can be furthermore improved. It is made possible to determine the sleeve placement position reliably.

According to the eleventh aspect of the present invention, good visibility as a color combination is provided. Thus, it is hard to put a load on the worker who works for many hours; it is made possible to improve work efficiency.

Therefore, it can contribute to cost reduction.

According to the twelfth aspect of the present invention, if a collimator lens is provided on the incidence side, such light originally radiated to the clad can also be transmitted. In contrast, if a collimator lens is provided on the emission side, light can be gathered.

Therefore, the optical connector intended for decreasing the light power loss and widening a transmission margin can be provided like that described above.

According to the thirteenth aspect of the present invention, the sleeve is formed by cutting an optical fiber source line or a waste tip of the optical fiber source line and thus can be provided with general versatility. It contributes to improvement in yield and further the sleeve can be manufactured by recycling an optical fiber.

Therefore, the optical connector that can further lead to cost reduction can be provided.

According to the fourteenth aspect of the present invention, the reception amount of incident light, namely, the light reception limit becomes large and the coupling efficiency is improved. The transmission distance is markedly short as compared with that of the optical fiber, thus if the N.A. becomes large, the transmission speed involved in the whole of the optical fiber is not affected and the transmission speed similar to that in the related art can be maintained. Further, the limit of light reception becomes markedly large as compared with that in the related art. Thus, if an optical axis shift occurs, the light power loss can be suppressed as much as possible.

Therefore, the sleeve intended for decreasing the light power loss and widening a transmission margin when light communication is executed can be provided.

According to the fifteenth aspect of the invention, the N.A. of the sleeve can be selected matching the N.A. of the optical fiber placed in the optical connector.

According to the sixteenth aspect of the present invention, the N.A. becomes more preferred N.A. considering the productivity and general versatility in the above-mentioned range. Advantages in the sleeve similar to those described above can be provided, of course.

According to the seventeenth aspect of the present invention, the holder is formed of a synthetic resin material which is a material equal to or softer than the receptacle forming a part of the optical connector is placed. Thus, it is made possible to suppress an optical axis shift.

Therefore, the optical connector intended for decreasing the light power loss and widening a transmission margin can be provided.

According to the eighteenth aspect of the present invention, a synthetic resin material having general versatility is used and it is made possible to contribute to cost reduction, of course.

Therefore, the connector that can also lead to cost reduction can be provided.

According to the nineteenth aspect of the invention, the holder is colored, whereby whether or not the sleeve is reliably placed at a predetermined position can be checked easily, and widening a gap when the sleeve is placed in the optical connector can be suppressed.

Therefore, the sleeve intended for decreasing the light power loss and widening a transmission margin can be provided.

According to the twentieth aspect of the present invention as claimed in claim 20, when the sleeve is placed at the assembling time of the optical connector or the sleeve placement position is checked, visibility is enhanced. It is made possible for the worker to make an accurate determination as to placement of the sleeve.

According to the twenty-first aspect of the present invention, the holder is colored in two distinguishable colors, so that visibility can be furthermore improved. It is made possible to determine the sleeve placement position reliably.

According to the twenty-second aspect of the present invention, if a collimator lens is provided on the incidence side in the optical connector, such light originally radiated to the clad can also be transmitted. In contrast, if a collimator lens is provided on the emission side in the optical connector, light can be gathered.

Therefore, the sleeve intended for decreasing the light power loss and widening a transmission margin can be provided like that described above.

According to the twenty-third aspect of the present invention, the sleeve is formed by cutting an optical fiber source line or a waste tip of the optical fiber source line and thus the optical fiber can be provided with general versatility. It contributes to improvement in yield and further the sleeve can be manufactured by recycling an optical fiber.

Therefore, the sleeve that can further lead to cost reduction can be provided.

According to the twenty-fourth aspect of the present invention, it is made possible to protect the light transmission member by the holder as in the related art. The holder is a synthetic resin material and thus the holder itself becomes softer than the metal in the related art. When the holder is placed in the optical connector, the trouble as in the related art wherein the holding member of the sleeve is scraped on the end face of the holder is avoided. Thus, it is made possible to suppress an optical axis shift.

Therefore, the sleeve intended for decreasing the light power loss and widening a transmission margin can be provided.

According to the twenty-fifth aspect of the present invention, the holder is colored, whereby whether or not the sleeve is reliably placed at a predetermined position can be checked easily, and widening a gap when the sleeve is placed in the optical connector can be suppressed.

Therefore, the sleeve intended for decreasing the light power loss and widening a transmission margin can be provided.

According to the twenty-sixth aspect of the present invention as claimed in claim 26, the holder is colored in two distinguishable colors, so that visibility can be furthermore improved. It is made possible to determine the sleeve placement position reliably.

According to the twenty-seventh aspect of the present invention, such a manufacturing method is adopted, whereby the optical fiber placed in the optical connector can be provided with general versatility. It contributes to improvement in yield and further the sleeve can be manufactured by recycling an optical fiber.

Therefore, the sleeve manufacturing method that can lead to cost reduction can be provided.

According to the twenty-eighth aspect of the present invention, it is made possible to manufacture the sleeve independently of the coat color of the optical fiber source line that the holder is made of.

Therefore, it can further contribute to cost reduction.

BRIEF DESCRIPTION OF THE DRAWINGS

In the accompanying drawings:

FIG. 7A is a schematic representation of a cutting step, FIG. 7B is a schematic representation of a coarse grinding step, FIG. 7C is a schematic representation of a grinding step with a buff, and FIG. 7D is a schematic representation of a dirt removing step;

DETAILED DESCRIPTION OF PREFERRED EMBODIMENTS

Referring now to the accompanying drawings, there is shown one preferred embodiment of the invention.

Figure 1:
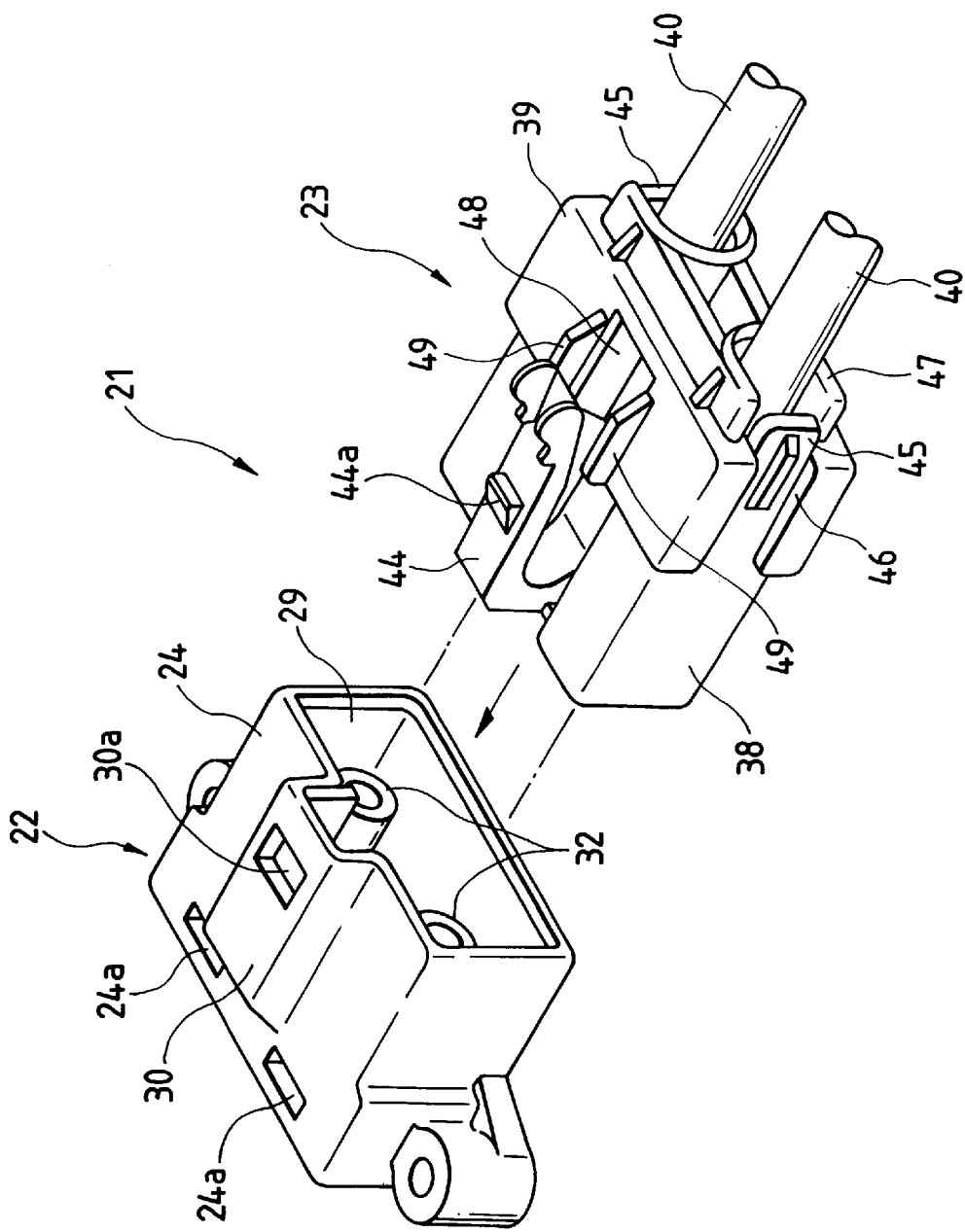
FIG. 1 is an exploded perspective view to show one embodiment of an optical connector according to the invention.
Figure 2:
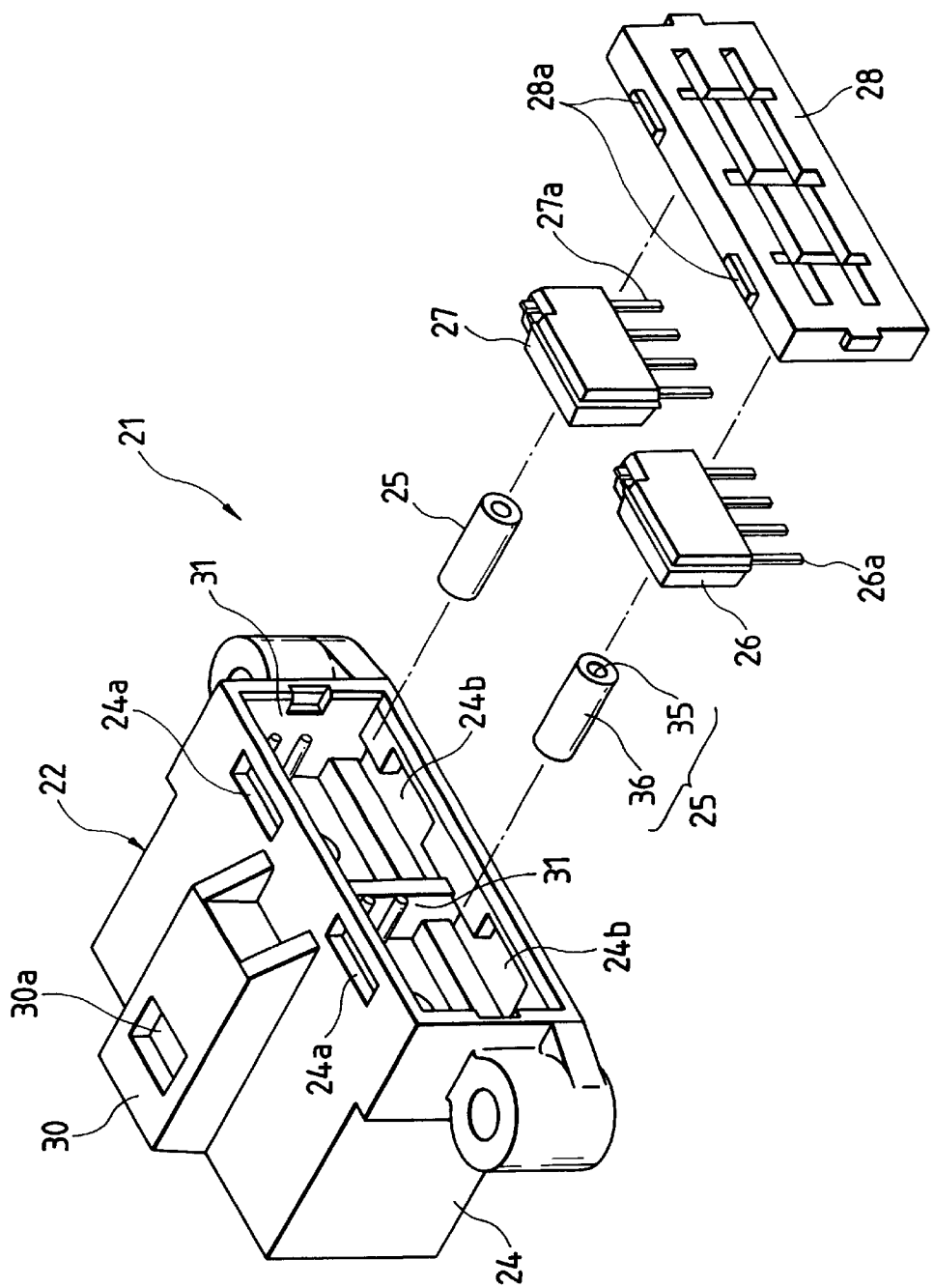
FIG. 2 is an exploded perspective view of a receptacle in FIG. 1.
Figure 3:
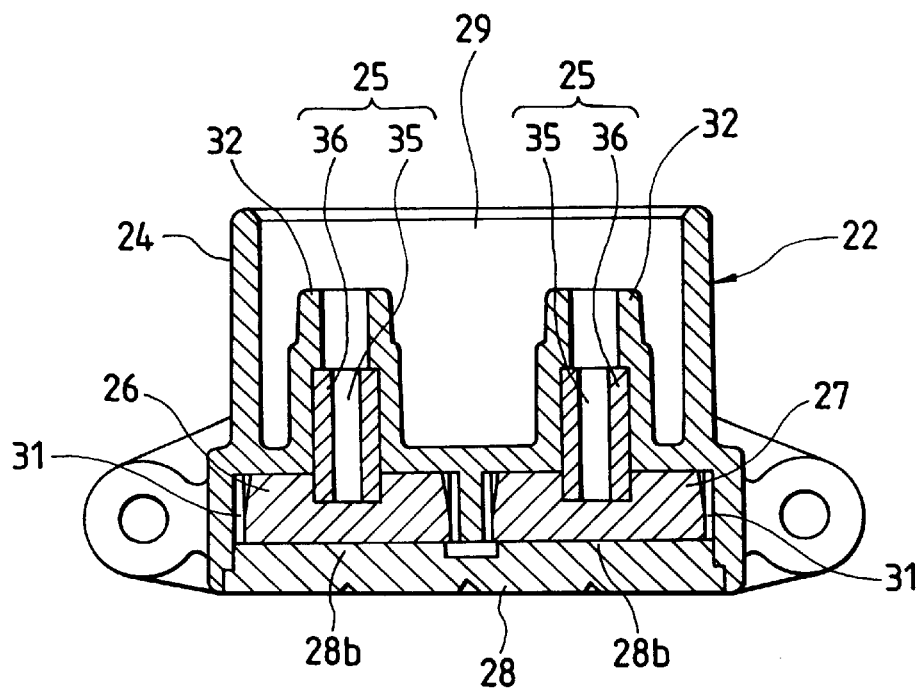
FIG. 3 is a transverse sectional view of the receptacle in FIG. 1.
Figure 4:
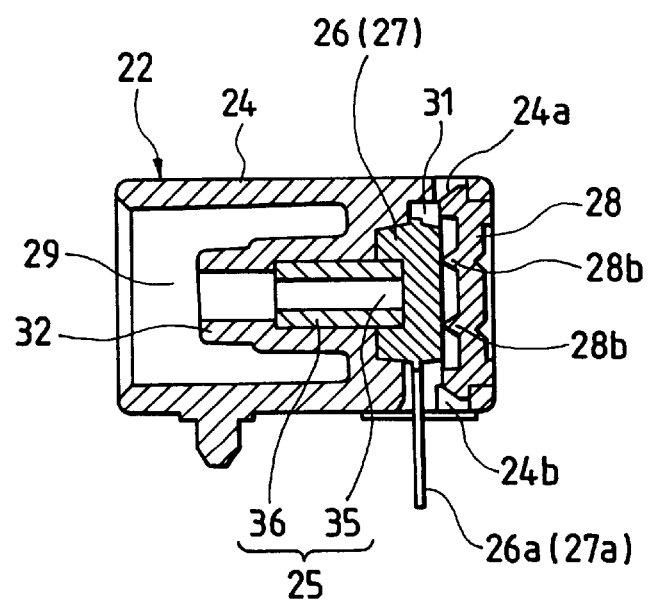
FIG. 4 is a longitudinal sectional view of the receptacle in FIG. 1.
Figure 5:
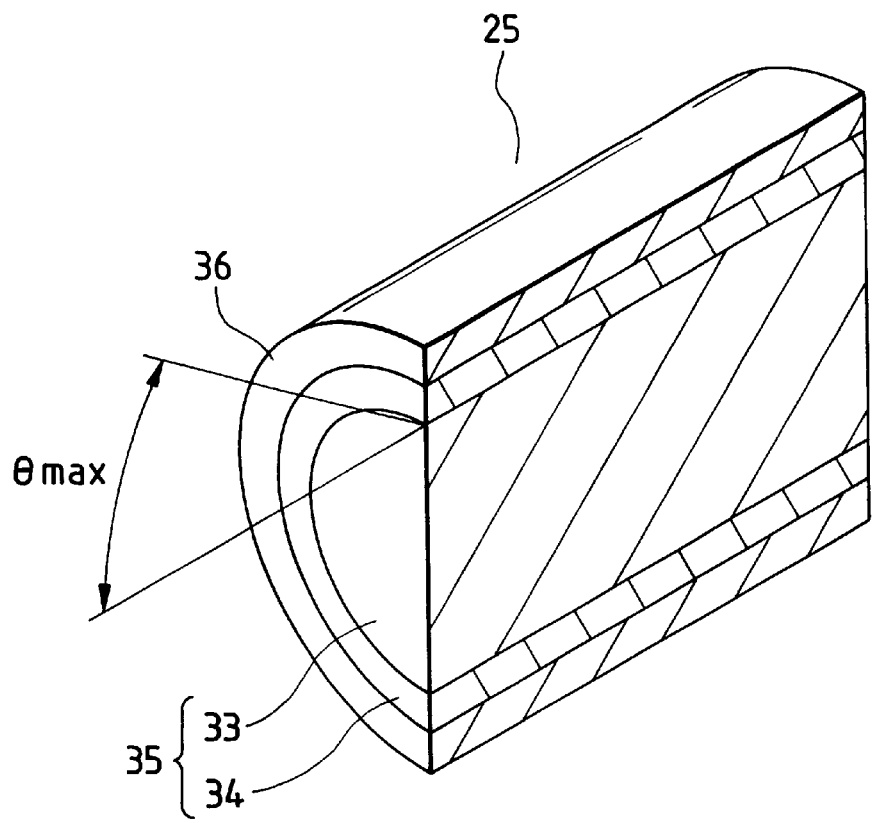
FIG. 5 is a longitudinal sectional view of a sleeve in FIG. 2.
Figure 6:
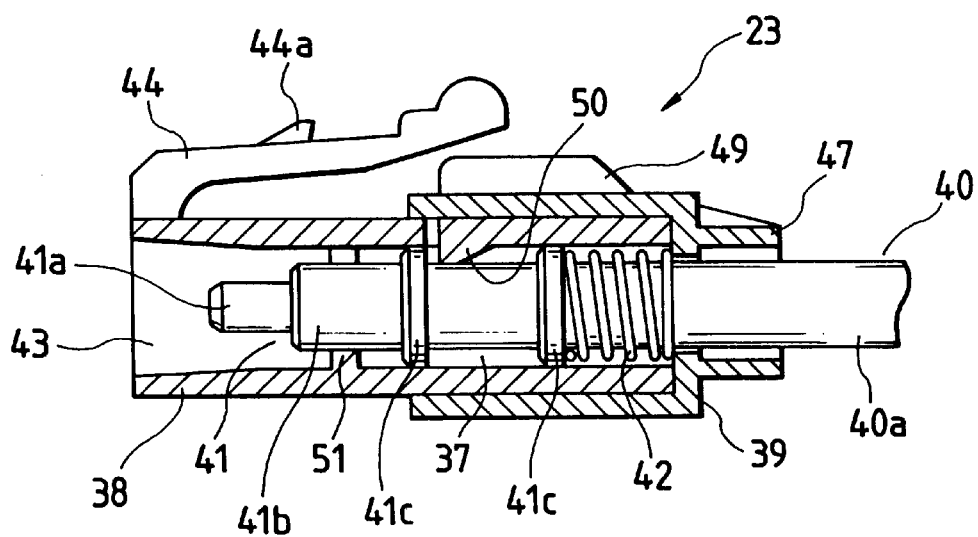
FIG. 6 is a longitudinal sectional view of an optical plug in FIG. 1.

FIG. 1 is an exploded perspective view to show one embodiment of an optical connector according to the invention. FIG. 2 is an exploded perspective view of a receptacle in FIG. 1, FIG. 3 is a transverse sectional view of the receptacle in FIG. 1, FIG. 4 is a longitudinal sectional view of the receptacle in FIG. 1, FIG. 5 is a longitudinal sectional view of a sleeve in FIG. 2, and FIG. 6 is a longitudinal sectional view of an optical plug in FIG. 1. In FIG. 1, reference numeral 21 denotes an optical connector used with a multiplex transmission circuit of a vehicle, such as an automobile, and the optical connector 21 comprises a receptacle 22 made of a synthetic resin and an optical plug 23.

As shown in FIGS. 1 and 2, the receptacle 22 has a connector housing 24 like a rectangle opened back and forth and the optical plug 23 is fitted into the front open portion of the connector housing 24. As shown in FIG. 2, sleeves 25 and 25, reception and transmission modules 26 and 27, and a cap 28 are fitted into the rear open portion in order.

As shown in FIG. 1, the connector housing 24 is formed in the front open portion with a fit part 29 to the optical plug 23 and is formed on a front top wall with an optical plug retention part 30 that a rocking arm 44 (described later) of the optical plug 23 engages.

The optical plug retention part 30 is formed in such a manner that a part of the fit part 29 is projected from the inside of the connector housing 24 to the outside thereof, and is formed on the top face with a rectangular engagement hole 30a corresponding to a retention protrusion 44a of the rocking arm 44.

As shown in FIG. 2, the connector housing 24 is formed in the rear open portion with storage chambers 31 and 31 corresponding to the reception and transmission modules 26 and 27. Each of the storage chambers 31 and 31 is formed with two openings 24a and 24b piercing top and bottom walls (see FIG. 4. Four (two because the lower margin side is not shown) engagement protrusions 28a formed on upper and lower margins of the cap 28 engage the openings 24a and 24b, and connection parts (electrodes) 26a and 27a of the reception and transmission modules 26 and 27 are derived to the outside through the openings 24b (see FIG. 4).

Further, as shown in FIGS. 3 and 4, in intermediate portions in the connector housing 24, reception tubes 32 and 32 communicating with the storage chambers 31 and 31 from the fit part 29 are extended in the direction corresponding to the above-mentioned front and rear and are formed integrally so as to project into the fit part 29. The reception tube 32, 32 is stepped both inside and outside and with the inner step as a boundary, the front side becomes a tube portion for placing a ferrule assembly 37 (described later; see FIG. 6) of the optical plug 23. In contrast, the sleeve 25, 25 is inserted into the rear of the step through the storage chamber 31, 31 and when the sleeve 25, 25 abuts the step, it is positioned.

For example, four minute protrusions (not shown) for retaining the sleeve 25, 25 are formed at equal intervals in the reception tube 32, 32 into which the sleeve 25, 25 is inserted.

As shown in FIG. 5, the sleeve 25 is made up of a light transmission member 35 consisting of a core 33 (refractive index: n1) and a clad 34, having a refractive index larger than that of the core (refractive index: n2 (n1>n2)) and a cylindrical and coat-like holder 36 placed in the outer peripheral margin of the light transmission member 35; the sleeve 25 of the embodiment is manufactured of a plastic optical fiber 52 (POF, see FIG. 7A) described later.

Since the sleeve 25 is formed having N.A. (numerical aperture) =0.6 and N.A. is defined as sin θmax (=[(n1)2−(n2)2]½), the maximum light reception angle θmax is nearly equal to 36.9 degrees.

Therefore, the maximum light reception angle θmax becomes large by about 6.9 degrees as compared with the sleeve in the related art (in which the sleeve having N.A.= 0.5 is used) and more light can be received, of course; thus the sleeve 25 contributes to a decrease in a light power loss.

That is, for example, giving a description on optical connection to the transmission module 27, if a distance exists between the element of the transmission module 27 (not shown) and the sleeve 25 (the element of the transmission module 27 (not shown) is buried and in fact, a distance occurs), more light than before can be received because the maximum light reception angle θmax becomes large.

The holder 36 corresponds to the coat portion of a plastic optical fiber 54 (POF, see FIG. 7A) described later, and is made of a synthetic resin (PE: Polyethylene). It is made of a material softer than the connector housing 24 of the receptacle molded of PPS (polyphenylene sulfide); however, it is not limited to the material and may be an equivalent or soft material and preferably, a general-purpose synthetic resin is used to decrease the costs.

The reception and transmission modules 26 and 27 shown in FIG. 2 use modules of known configurations and therefore will not be discussed in detail. The cap 28 is formed with two protrusions 28b and 28b which are roughly triangular in cross section for pressing the reception and transmission modules 26 and 27.

On the other hand, as shown in FIG. 6, the optical plug 23 comprises the ferrule assemblies 37 and 37 (see FIG. 6, only one is shown), a plug housing 38 made of a synthetic resin (for example, the above-mentioned PPS), and a spring cap 39.

The ferrule assembly 37 is made up of an optical fiber 40, a ferrule 41 attached to the tip of the optical fiber 40, and a spring 42.

The optical fiber 40, which is already known, is made up of a light transmission member (not shown) consisting of a core (not shown) and a clad (not shown) having a refractive index smaller than the core has and a primary sheath (not shown) and a secondary sheath 40a for coating the light transmission member (not shown); the primary sheath (not shown) and the secondary sheath 40a on the tip side are stripped off and are attached to the ferrule 41 although not shown. The N.A. of the optical fiber 40 is 0.5 as in the related art.

The ferrule 41 is made of a synthetic resin and has a small diameter part 41a and a large diameter part 41b each roughly like a cylinder; the light transmission member (not shown) of the optical fiber 40 is housed in the small-diameter part 41a and the primary sheath (not shown) is housed in the large-diameter part 41b. The ferrule 41 and the optical fiber 40 are fixed strongly with an adhesive, etc., so as to prevent the optical fiber 40 from being left out of the ferrule 41.

The large-diameter part 41b is formed on the periphery with two flange parts 41c and 41c and a spring 42 is placed between the rear flange part 41c and the spring cap 39.

The plug housing 38 is a rectangular box having hollow housing chambers 43 and 43 (only one is shown) for housing the ferrule assemblies 37 and 37 and is formed at the front end of the top wall with a rocking arm 44 extending backward at a position partitioning the housing chambers 43 and 43 (see FIG. 1). The rocking arm 44 has a retention protrusion 44a engaging the engagement hole 30a (see FIGS. 1 and 2) in the optical plug retention part 30 and the tip part of the rocking arm 44 is pressed, whereby the fit operation into the receptacle 22 of the optical plug 23 is enabled (see FIG. 1).

As shown in FIG. 1, the plug housing 38 is formed on the rears of both side walls with slit covers 45 and 45 each roughly like a strip projecting backward from the rear end face of the plug housing 38 for closing plug introduction slits 46 and 46 (described later) of the spring cap 39.

As shown in FIG. 1, the spring cap 39 is formed over both side walls and a part of the rear end face with the plug introduction slits 46 and 46 as notches and a support wall 47 is placed integrally so as to project in the proximity of the margins of the plug introduction slits 46 and 46 (only one is shown) on the rear end face. The spring cap 39 is formed at the center of the top wall with a concave part 48 corresponding to the rocking arm 44 and protection walls 49 and 49 are placed upright on both sides with the concave part 48 between.

The spring 42 abuts the inside of the rear end face of the spring cap 39 (see FIG. 6). The spring cap 39 is formed at the internal center with a retention protrusion (not shown) corresponding to the plug housing 38.

After the ferrule assemblies 37 and 37 are placed through the plug introduction slits 46 and 46 of the spring cap 39, the spring cap 39 is engaged with the plug housing 38, whereby the optical plug 23 is assembled. When the ferrule assemblies 37 and 37 are housed in the housing chambers 43 and 43, retention protrusions 50 and 50 (see FIG. 6, only one is shown) placed on the plug housing 38 are fitted to space between the two flange parts 41c and 41c of the ferrule 41, regulating the positions of the ferrule assemblies 37 and 37. The ferrule assemblies 37 and 37 are urged forward by the springs 42 and 42 and stoppers 51 and 51 (see FIG. 6, only one is shown) formed in the housing chambers 43 and 43 suppress projection of the ferrule assemblies 37 and 37.

In the described configuration, if the optical plug 23 is fitted into the receptacle 22, the reception tube 32 enters the plug housing 38 and at the same time, the small-diameter part 41a of the ferrule assembly 37 enters the reception tube 32. The large-diameter part 41b of the ferrule assembly 37 abuts the tip of the reception tube 32 and adequate contact pressure is kept by the elastic force of the spring 42.

In this state, the tip part of the ferrule assembly 37 and the sleeve 25 and the reception, transmission module 26, 27 and each sleeve 25 are placed with gaps (not shown) kept to the minimum.

Next, a manufacturing method for the sleeve 25 will be discussed.

Figure 7A:
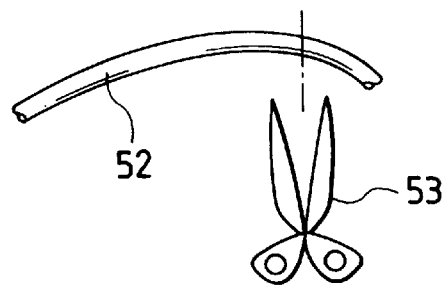
FIGS. 7A to 7D are schematic representations of a manufacturing process of the sleeve in FIG. 2.

First, as shown in FIG. 7A, an optical fiber source line, for example, a plastic optical fiber 52 (POF) is cut with appropriate cut means such as scissors or a cutter (not shown) (it can be cut not only manually, but also by an automatic machine).

Figure 7B:
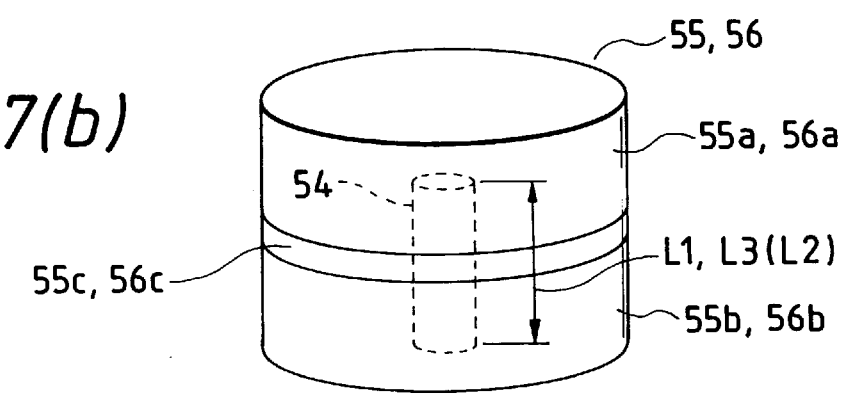

The cut POF piece is denoted by reference numeral 54 (see FIG. 7B, at the time, the POF 54 has length L1). The optical fiber source line refers to an optical fiber wound around the same bobbin as that when the optical fiber 40 is manufactured, for example. Further, the optical fiber source line is not limited to it and waste pieces of the optical fiber source line or unnecessary optical fibers can also be used if they can be recycled.

Subsequently, the POF 54 is fixed in a first grinding jig 55 roughly like a cylinder shown in FIG. 7B. The first grinding jig 55 has an upper grinding part 55a and a lower grinding part 55b and an intermediate plate 55c is placed therebetween.

Figure 7C:
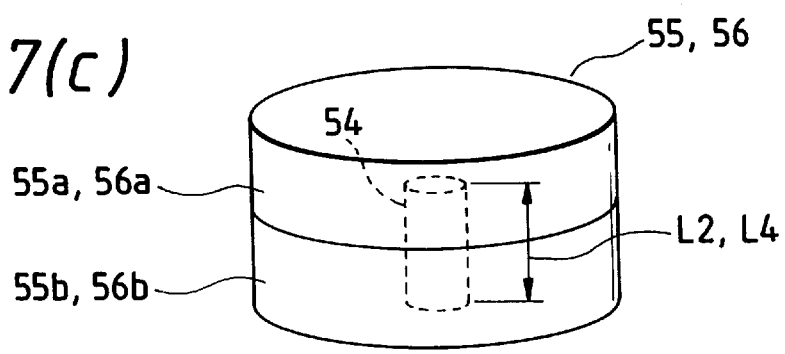

Subsequently, the POF 54 is coarsely ground with waterproof grinding paper (#1500). After the intermediate plate 55c is removed, the POF 54 is ground with a buff (#2000) as shown in FIG. 7C. At the time, the POF 54 has length L2.

Subsequently, the POF 54 is fixed in a second grinding jig 56 roughly like a cylinder shown in FIG. 7B. Like the first grinding jig 55, the second grinding jig 56 has an upper grinding part 56a and a lower grinding part 56b and an intermediate plate 56c is placed therebetween. The length L3 of the POF 54 is the same as L2.

Subsequently, the POF 54 is coarsely ground with waterproof grinding paper (#1500). After the intermediate plate 56c is removed, the POF 54 is ground with a buff (#2000) as shown in FIG. 7C. At the time, the POF 54 has length L4.

Figure 7D:
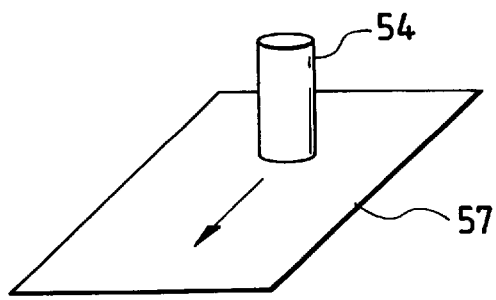

Subsequently, the POF 54 is removed from the second grinding jig 56 and as shown in FIG. 7D, the POF 54 is cleaned with a dedicated cloth 57, thereby removing dirt on both end faces of the POF 54.

Last, the dimension between both end faces of the POF 54 is checked (not shown). It is also possible that manufacturing the sleeve 25 (see FIG. 5) is now complete. In the embodiment, however, to enable reliable placement in the reception tube 32 (see FIGS. 3 and 4), the sleeve is colored for suppressing optical axis shift and gap occurrence; preferably, the sleeve is colored in a different color from that of the receptacle 22 because of visibility.

Figure 8:
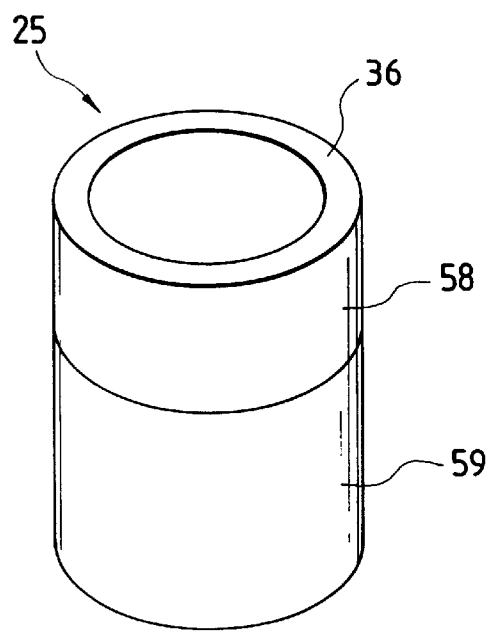
FIG. 8 is a schematic representation of a coloring state of the sleeve in FIG. 2.
Figure 10:
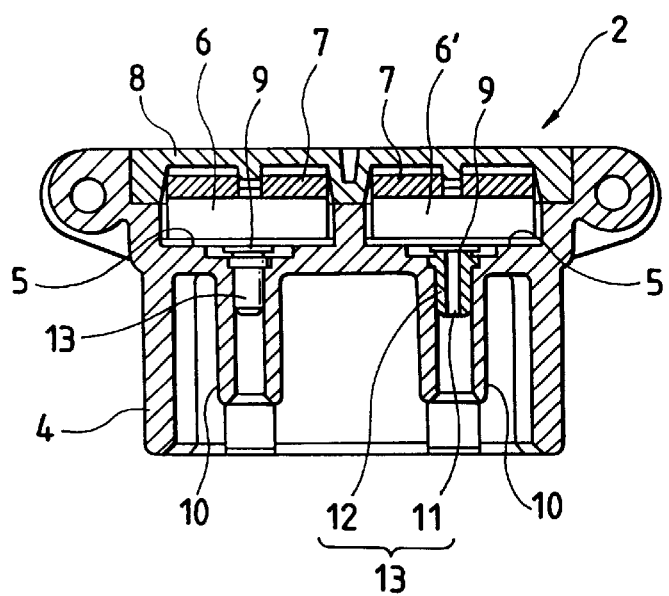
FIG. 10 is a transverse sectional view of a receptacle in FIG. 9.
Figure 9:
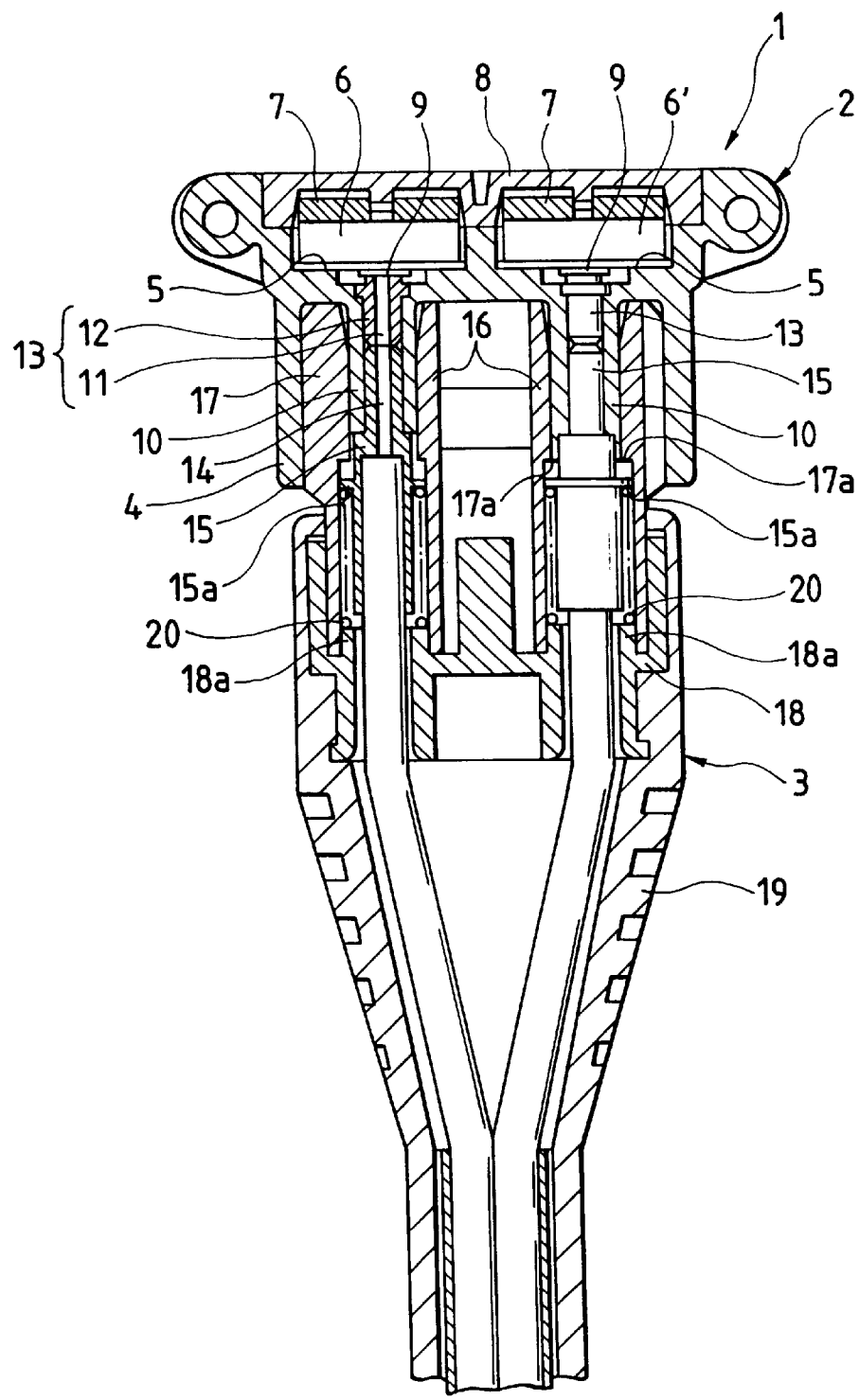
FIG. 9 is a transverse sectional view of an optical connector in a related art.
Figure 11:
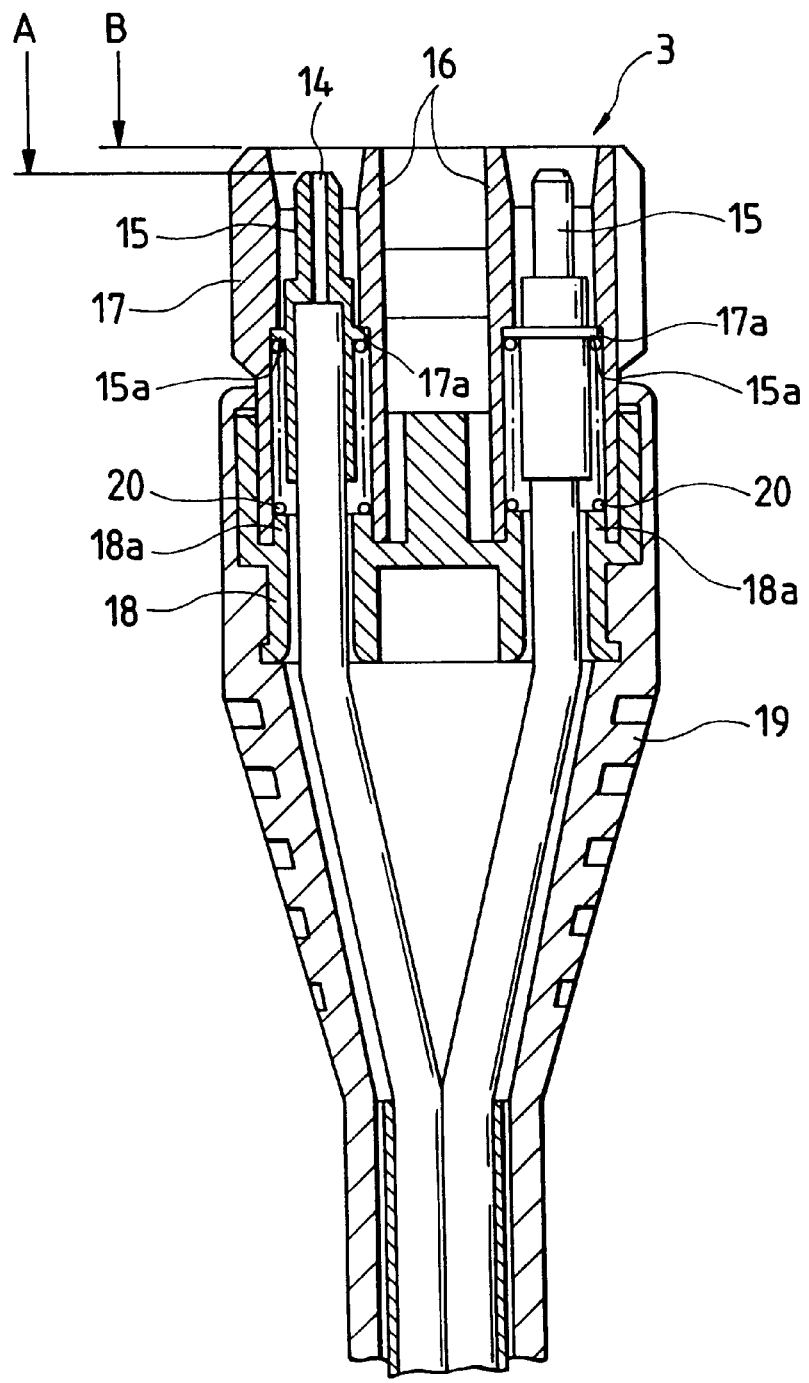
FIG. 11 is transverse sectional view of an optical plug in FIG. 9.
Figure 12:
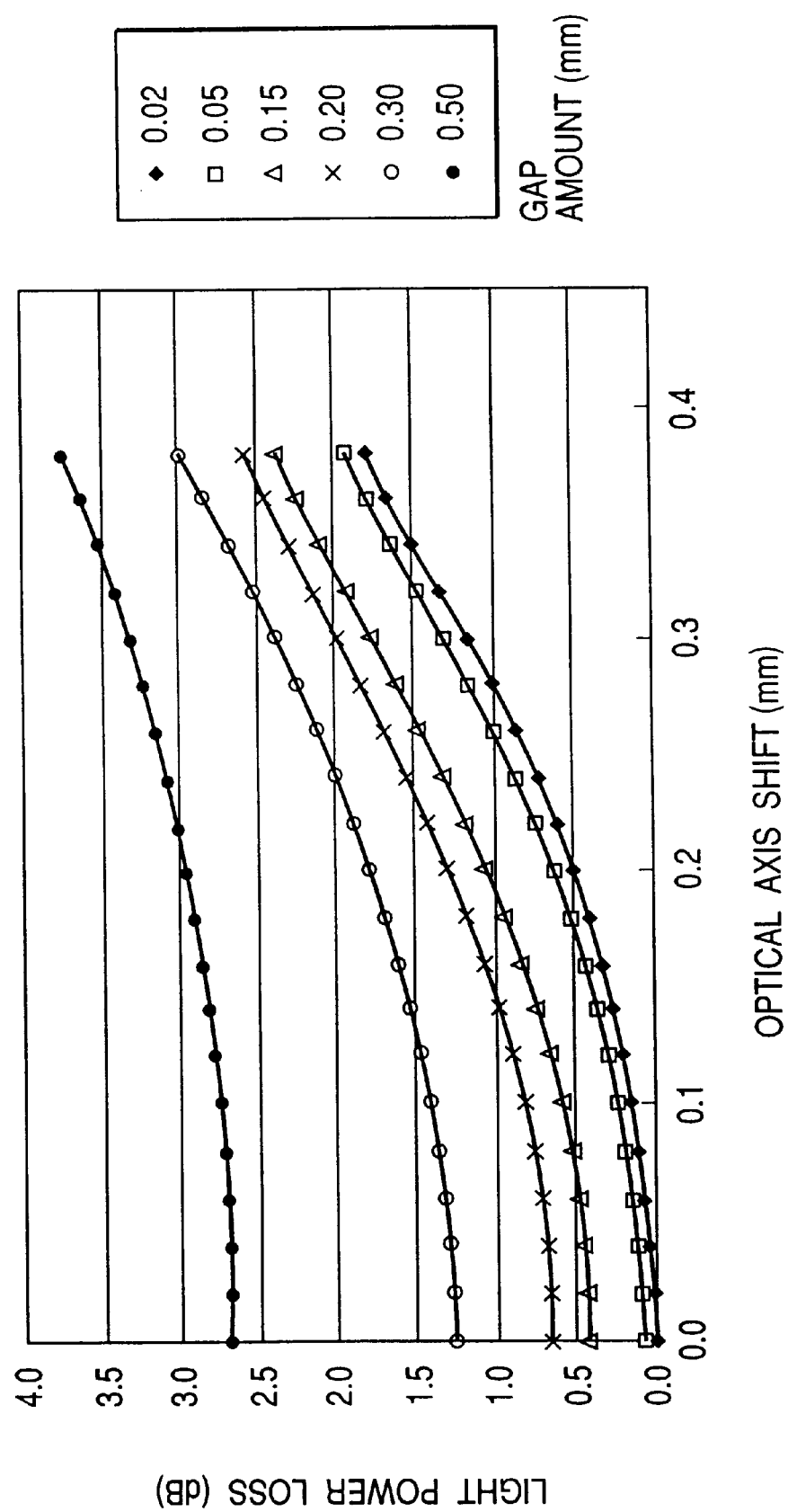
FIG. 12 is a graph to represent the relationship between optical axis shift and light power loss.

That is, as shown in FIG. 8, the holder 36 is colored on the surface in two distinguishable colors 58 and 59. The purpose of adopting two colors 58 and 59 is to rapidly determine the projection amount of a part of the sleeve 25 to the storage chamber 31 (see FIGS. 3 and 4).

By the way, the receptacle 22 of the embodiment (see FIGS. 1 and 2) is molded of a black synthetic resin and the color 58 on the projection side of the sleeve 25 is orange, which is color providing good visibility, determined by worker inspection, and is hard to put a load on the worker who works for many hours; work efficiency can be improved.

The holder 36 can also be colored on the surface in a single color, of course. At the time, the effect on work for many hours can be produced.

As described so far with reference to FIGS. 1 to 8, the N.A. of the sleeve 25 is larger than that of the optical fiber 40, so that the light reception amount of the sleeve 25, namely, the light reception limit becomes large and the total efficiency is improved.

If the N.A. of the sleeve 25 is set to 0.5<N.A.<1, the light reception limit becomes larger than that in the related art, of course; in addition, it is also made possible to properly use (select) the sleeve 25 matching the N.A. of the corresponding optical fiber 40.

Further, if the N.A. of the sleeve 25 is set to 0.6 or 0.7, the productivity and general versatility are not adversely affected. That is, if the N.A. is 0.6 or 0.7, the POF 52 itself from which the sleeve 25 is manufactured can be used with other products, etc., as an optical fiber of a comparatively short distance, for example. (The sleeve 25 is not customized.)

The relationship between the N.A. of the sleeve 25 and light power is as listed in Table 1 given below. (Light from the transmission module 27 is received at the sleeve 25 and then is transmitted 1 m in the optical fiber 40. At the time, the light power is measured.)

Comparing the light power with the sleeve 25 with that with the sleeve in the related art (N.A.=0.5), the difference therebetween becomes 0.9 dBm, 1.6 dBm, meaning a decrease in the light power loss as much as the value.

TABLE 1

| N.A. of sleeve | Power (dBm) |
| --- | --- |
| 0.5(in related art) | −8.5 |
| 0.6 | −7.6 |
| 0.7 | −6.9 |

On one hand, if the N.A. of the sleeve 25 becomes large, the transmission distance is markedly short as compared with that of the optical fiber 40, thus the transmission speed involved in light communication is not affected and the transmission speed similar to that in the related art can be maintained.

The limit of light reception becomes markedly large as compared with that in the related art. Thus, if an optical axis shift occurs, it is absorbed and the light power loss can be suppressed as much as possible.

Further, a transmission margin can be widened downstream from the optical connector 21 as much as the light power loss is suppressed.

On the other hand, the holder 36 forming a part of the sleeve 25 is a synthetic resin material and thus the holder 36 itself becomes softer than the metal in the related art. Therefore, when the holder 36 is placed in the optical connector 25, the trouble as in the related art wherein the holding member of the sleeve 25 (minute protrusion not shown) is scraped on the end face of the holder 36 is avoided. The light reception face of the sleeve 25 becomes perpendicular to the optical axis, so that an optical axis shift can be suppressed.

Since the holder 36 is colored, whether or not the sleeve 25 is reliably placed at a predetermined position can be checked easily, and widening a gap can be suppressed. If the holder 36 is colored in two distinguishable colors 58 and 59 as described above, visibility is further enhanced. Of course, if the work area is dark, it is effective to color the holder 36 in two distinguishable colors.

Further, the sleeve 25, which is formed from the POF 52 such as an optical fiber source line, can contribute to improvement in yield and recycling, and since the sleeve can be provided more easily than a new sleeve is designed and manufactured, cost reduction can be accomplished.

Various modified embodiments of the invention are possible without departing from the spirit and the scope of the invention, needless to say.

That is, the sleeve 25 can be disposed at least only in the transmission module 27. In this case, the advantages similar to those described above can also be provided.

A collimator lens can be formed at least at one end of the light transmission member 35. If the collimator lens is provided on the incidence side, such light originally radiated to the clad 34 can also be transmitted. In contrast, if the collimator lens is provided on the emission side, light can be gathered.

Further, it is also possible to decrease the light power loss simply by changing the material of the holder 36 or coloring the holder 36 with the N.A. of the sleeve 25 set as in the related art.

As listed in Table 2 given below, the light power loss can also be decreased if the N.A.s of the sleeve 25 and the optical fiber 40 are set to 0.6.

TABLE 2

| | | N.A. of optical fiber | |
| --- | --- | --- | --- |
| | | 0.5 | 0.6 |
| N.A. of sleeve | 0.5 | −8.5 dBm | −8.3 dBm |
| | 0.6 | −7.6 dBm | −7.5 dBm |

However, it is feared that the transmission speed of the optical fiber 40 may be affected; thus, preferably the forms described above are adopted.

As described above, according to the first aspect of the present invention, the optical connector comprises sleeves placed between an optical fiber and reception and transmission modules, wherein the N.A. of each of the sleeves is made larger than the N.A. of the optical fiber.

The N.A. of the sleeve is thus made larger, whereby the light reception amount of the sleeve, namely, the light reception limit becomes large and the coupling efficiency is improved. The transmission distance of the sleeve is markedly short as compared with that of the optical fiber, thus if the N.A. becomes large, the transmission speed is not affected and the transmission speed similar to that in the related art can be maintained. Further, the limit of light reception becomes markedly large as compared with that in the related art. Thus, if an optical axis shift occurs, the light power loss can be suppressed as much as possible.

According to the second aspect of the present invention, the N.A. of at least the sleeve corresponding to the transmission module is larger than the N.A. of the optical fiber used with the optical connector.

Thus the N.A. of at least the sleeve corresponding to the transmission module is made large, whereby the reception limit of light emitted from the transmission module becomes markedly large than that in the related art.

Therefore, the optical connector intended for decreasing the light power loss and widening a transmission margin can be provided like that described above.

According to the third aspect of the present invention, the N.A. of each of the sleeves is 0.5<N.A.<1, so that the N.A. of the sleeve can be selected matching the N.A. of the optical fiber used with the optical connector.

According to the fourth aspect of the invention, the N.A. of each of the sleeves is 0.6 or 0.7 and becomes more preferred N.A. considering the productivity and general versatility in the above-mentioned range. Advantages in the optical connector similar to those described above can be provided, of course.

According to the fifth aspect of the present invention, the sleeve is made up of a light transmission member consisting of a core and a clad and a cylindrical and coat-like holder, and the holder is formed of a synthetic resin material.

The sleeve is thus formed, whereby it is made possible to protect the light transmission member by the holder as in the related art. The holder is a synthetic resin material and thus the holder itself becomes softer than the metal in the related art. When the holder is placed in the optical connector, the trouble as in the related art wherein the holding member of the sleeve is scraped on the end face of the holder is avoided. Thus, it is made possible to suppress an optical axis shift.

Therefore, the optical connector intended for decreasing the light power loss and widening a transmission margin can be provided like that described above.

According to the sixth aspect of the present invention, the holder is formed of a synthetic resin material which is a material equal to or softer than the member in which the sleeve is placed. Thus, it is made possible to suppress an optical axis shift.

Therefore, the optical connector intended for decreasing the light power loss and widening a transmission margin can be provided.

According to the seventh aspect of the present invention, the holder is formed of polyethylene, thus a synthetic resin material having general versatility is used and it is made possible to contribute to cost reduction, of course.

Therefore, the optical connector that can also lead to cost reduction can be provided.

According to the eighth of the present invention, the holder is colored in a different color from that of the member in which the sleeve is placed.

Thus, the holder is colored, whereby whether or not the sleeve is reliably placed at a predetermined position can be checked easily, and widening a gap can be suppressed.

Therefore, the optical connector intended for decreasing the light power loss and widening a transmission margin can be provided.

According to the ninth aspect of the present invention, the color of the holder is a different family color from the color of the member in which the sleeve is placed, so that visibility is enhanced and the sleeve placement position can be determined reliably.

According to the tenth aspect of the present invention, the holder is colored in two distinguishable colors, so that visibility can be furthermore improved. The sleeve placement position can be determined reliably.

According to the eleventh aspect of the present invention, one of the two distinguishable colors is orange if the color of the member in which the sleeve is placed is black, so that good visibility as a color combination is provided. Thus, it is hard to put a load on the worker who works for many hours; it is made possible to improve work efficiency.

Therefore, it can contribute to cost reduction.

According to the twelfth aspect of the present invention, a collimator lens is formed at least at one end of the light transmission member. Thus, if the collimator lens is provided on the incidence side, such light originally radiated to the clad can also be transmitted. In contrast, if the collimator lens is provided on the emission side, light can be gathered.

Therefore, the optical connector intended for decreasing the light power loss and widening a transmission margin can be provided like that described above.

According to the thirteenth aspect of the present invention, the sleeve is formed by cutting an optical fiber source line or a waste tip of the optical fiber source line and thus can be provided with general versatility. It contributes to improvement in yield and further the sleeve can be manufactured by recycling an optical fiber.

Therefore, the optical connector that can further lead to cost reduction can be provided.

According to the fourteenth aspect of the present invention as claimed in claim 14, the sleeve is placed between an optical fiber and a reception module or a transmission module placed in an optical connector and capable of providing optical connection of the optical fiber and the reception or transmission module, and comprises a light transmission member consisting of a core and a clad and a cylindrical and coat-like holder; the sleeve is formed in a larger N.A. than that of the optical fiber and is placed corresponding to at least the transmission module.

Thus, the reception amount of incident light, namely, the light reception limit becomes large and the coupling efficiency is improved. The transmission distance is markedly short as compared with that of the optical fiber, thus if the N.A. becomes large, the transmission speed involved in the whole of the optical fiber is not affected and the transmission speed similar to that in the related art can be maintained. Further, the limit of light reception becomes markedly large as compared with that in the related art. Thus, if an optical axis shift occurs, the light power loss can be suppressed as much as possible.

Therefore, the sleeve intended for decreasing the light power loss and widening a transmission margin when light communication is executed can be provided.

According to the fifteenth aspect of the present invention as claimed in claim 15, the larger N.A. than that of the optical fiber is 0.5<N.A.<1, thus the N.A. of the sleeve can be selected matching the N.A. of the optical fiber placed in the optical connector.

According to the sixteenth aspect of the present invention, the larger N.A. than that of the optical fiber is 0.6 or 0.7; it becomes more preferred N.A. considering the productivity and general versatility in the above-mentioned range. Advantages in the sleeve similar to those described above can be provided, of course.

According to the seventeenth aspect of the present invention, the holder is formed of a synthetic resin material which is a material equal to or softer than the receptacle forming a part of the optical connector is placed. Thus, it is made possible to suppress an optical axis shift.

Therefore, the optical connector intended for decreasing the light power loss and widening a transmission margin can be provided.

According to the eighteenth aspect of the present invention, the holder is formed of polyethylene, thus a synthetic resin material having general versatility is used and it is made possible to contribute to cost reduction, of course.

Therefore, the connector that can also lead to cost reduction can be provided.

According to the nineteenth aspect of the present invention as claimed in claim 19, the holder is colored in a different color from that of the receptacle.

The holder is thus colored, whereby whether or not the sleeve is reliably placed at a predetermined position can be checked easily, and widening a gap when the sleeve is placed in the optical connector can be suppressed.

Therefore, the sleeve intended for decreasing the light power loss and widening a transmission margin can be provided.

According to the twentieth aspect of the present invention, the color of the holder is a different family color from the color of the receptacle. Thus, when the sleeve is placed at the assembling time of the optical connector or the sleeve placement position is checked, visibility is enhanced. The worker can make an accurate determination as to placement of the sleeve.

According to the twenty-first aspect of the present invention, the holder is colored in two distinguishable colors, so that visibility can be furthermore improved. The sleeve placement position can be determined reliably.

According to the twenty-second aspect of the present invention, a collimator lens is formed at least at one end of the light transmission member. Thus, if the collimator lens is provided on the incidence side in the optical connector, such light originally radiated to the clad can also be transmitted. In contrast, if the collimator lens is provided on the emission side in the optical connector, light can be gathered.

Therefore, the sleeve intended for decreasing the light power loss and widening a transmission margin can be provided like that described above.

According to the twenty-third aspect of the present invention, the sleeve is formed by cutting an optical fiber source line or a waste tip of the optical fiber source line and thus the optical fiber can be provided with general versatility. It contributes to improvement in yield and further the sleeve can be manufactured by recycling an optical fiber.

Therefore, the sleeve that can further lead to cost reduction can be provided.

According to the twenty-fourth aspect of the present invention, the sleeve is placed between an optical fiber and a reception module or a transmission module placed in an optical connector and capable of providing optical connection of the optical fiber and the reception or transmission module, and comprises a light transmission member consisting of a core and a clad and a cylindrical and coat-like holder; the holder is formed of a synthetic resin material which is a material equal to or softer than a receptacle forming a part of the optical connector.

The sleeve is thus formed, whereby it is made possible to protect the light transmission member by the holder as in the related art. The holder is a synthetic resin material and thus the holder itself becomes softer than the metal in the related art. When the holder is placed in the optical connector, the trouble as in the related art wherein the holding member of the sleeve is scraped on the end face of the holder is avoided. Thus, it is made possible to suppress an optical axis shift.

Therefore, the sleeve intended for decreasing the light power loss and widening a transmission margin can be provided.

According to the twenty-fifth aspect of the present invention, the holder is colored in a different color from that of the receptacle.

The holder is thus colored, whereby whether or not the sleeve is reliably placed at a predetermined position can be checked easily, and widening a gap when the sleeve is placed in the optical connector can be suppressed.

Therefore, the sleeve intended for decreasing the light power loss and widening a transmission margin can be provided.

According to the twenty-sixth aspect of the present invention, the holder is colored in two distinguishable colors, so that visibility can be furthermore improved. It is made possible to determine the sleeve placement position reliably.

According to the twenty-seventh aspect of the present invention, the manufacturing method of a sleeve comprising a light transmission member consisting of a core and a clad and a cylindrical and coat-like holder comprises the steps of cutting an optical fiber source line or a waste tip of the optical fiber source line and then grinding both end faces.

Such a manufacturing method is adopted, whereby the optical fiber placed in the optical connector can be provided with general versatility. It contributes to improvement in yield and further the sleeve can be manufactured by recycling an optical fiber.

Therefore, the sleeve manufacturing method that can lead to cost reduction can be provided.

According to the twenty-eighth aspect of the present invention, the holder is colored before or after both end faces of the sleeve are ground. Thus, it is made possible to manufacture the sleeve independently of the coat color of the optical fiber source line that the holder is made of.

Therefore, it can further contribute to cost reduction.

What is claimed is:

1. An optical connector comprising:
   an optical fiber;
   a reception module and a transmission module; and
   optical connection members capable of providing optical connection of the optical fiber and the reception and transmission modules, the optical connection member being placed between the optical fiber and the reception and transmission modules, respectively, wherein the numerical aperture of at least one of the optical connection members is larger than the numerical aperture of the optical fiber.

2. The optical connector as claimed in claim 1, wherein the numerical aperture of at least one of said optical connection members corresponding to the transmission module is larger than the numerical aperture of the optical fiber.

3. The optical connector as claimed in claim 1, wherein the numerical aperture of each of the optical connection members is between 0.5 and 1.

4. The optical connector as claimed in claim 1, wherein the numerical aperture of each of the optical connection members is one of 0.6 and 0.7.

5. The optical connector as claimed in claims 1, wherein each of the optical connection members comprises a light transmission member including a core and a clad having a smaller refractive index than the core and a cylindrically coat-like holder placed in an outer peripheral margin of the light transmission member, the holder is formed of a synthetic resin material.

6. The optical connector as claimed in claim 5, wherein the holder is formed of a synthetic resin material which is a material equal to or lower in hardness than a member in which one of said optical connection members is placed.

7. The optical connector as claimed in claim 5, wherein the holder is formed of polyethylene.

8. The optical connector as claimed in claim 5, wherein the holder is colored in a different color from that of a member in which one of said optical connection members is placed.

9. The optical connector as claimed in claim 8, wherein the color of the holder is a different family color from the color of the member in which one of said optical connection members is placed.

10. The optical connector as claimed in claim 8, wherein the holder is colored in two distinguishable colors.

11. The optical connector as claimed in claim 10 wherein one of the two distinguishable colors is orange if the color of the member in which the sleeve is placed is black.

12. The optical connector as claimed in claim 5 wherein a collimator lens is formed at least at one end of the light transmission member.

13. The optical connector as claimed in claim 1 wherein each of the optical connection member is formed by cutting at least one of an optical fiber source line and a waste tip of the optical fiber source line.

14. An optical connection member placed between an optical fiber and one of a reception module and a transmission module placed in an optical connector and capable of providing optical connection of the optical fiber and one of the reception and transmission module, said optical connection member comprising:

a light transmission member including a core and a clad having a smaller refractive index than the core; and a cylindrical holder placed in an outer peripheral margin of the light transmission member, wherein said optical connection member has a larger numerical aperture than that of the optical fiber.

15. The optical connection member as claimed in claim 14 wherein numerical aperture of the optical connection member is between 0.5 and 1.

16. The optical connection member as claimed in claim 14 wherein the numerical aperture of the optical connection member is 0.6 or 0.7.

17. The optical connection member as claimed in claim 14, wherein the holder is formed of a synthetic resin material which is a material equal to or lower in hardness than a receptacle forming a part of the optical connector.

18. The optical connection member as claimed in claim 17, wherein the holder is formed of polyethylene.

19. The optical connection member as claimed in claim 17, wherein the holder is colored in a different color from that of the receptacle.

20. The optical connection member as claimed in claim 19, wherein the color of the holder is a different family color from the color of the receptacle.

21. The optical connection member as claimed in claim 19, wherein the holder is colored in two distinguishable colors.

22. The optical connection member as claimed in claim 14, wherein a collimator lens is formed at least at one end of the light transmission member.

23. The optical connection member as claimed in claim 14, wherein said optical connection member is formed by cutting an optical fiber source line or a waste tip of the optical fiber source line.

24. A optical connection member placed between an optical fiber and one of a reception module and a transmission module placed in an optical connector and capable of providing optical connection of the optical fiber and one of the reception module and transmission module, said optical connection member comprising:

a light transmission member including a core and a clad having a smaller refractive index than the core; and a cylindrical holder placed in an outer peripheral margin of the light transmission member, wherein the holder is formed of a synthetic resin material which is a material having a hardness that is lower than the hardness of a receptacle forming a part of the optical connector.

25. The optical connection member as claimed in claim 24, wherein the holder is colored in a different color from that of the receptacle.

26. The optical connection member as claimed in claim 25, wherein the holder is colored in two distinguishable colors.

* * * * *